United States Patent [19]

Percival-Smith

[11] Patent Number: 5,527,015
[45] Date of Patent: Jun. 18, 1996

[54] HYDRAULIC TENSIONING DEVICE

[75] Inventor: Harry D. Percival-Smith, Manchester, England

[73] Assignee: Hydra-Tight Limited, England

[21] Appl. No.: 183,748

[22] Filed: Jan. 21, 1994

[30] Foreign Application Priority Data

Feb. 5, 1993 [GB] United Kingdom ............... 9302338

[51] Int. Cl.⁶ .................................................. E21B 19/00
[52] U.S. Cl. ............................................................ 254/29 A
[58] Field of Search ............................... 254/29 A, 93 R, 254/93 H; 81/57.38; 29/452

[56] References Cited

U.S. PATENT DOCUMENTS

| 3,230,799 | 1/1966 | Maciulaitis | 254/29 A |
| 3,321,182 | 5/1967 | Elenburg | 254/93 R |
| 4,052,652 | 10/1977 | Simnovec et al. | |

FOREIGN PATENT DOCUMENTS

| 2152910 | 4/1973 | France. |
| 2245681 | 1/1992 | United Kingdom. |
| WO89/02807 | 4/1989 | WIPO. |

Primary Examiner—Robert C. Watson
Attorney, Agent, or Firm—Nixon & Vanderhye

[57] ABSTRACT

A hydraulic nut 16 (FIG. 2) or (bolt 70 FIG. 5) has a body 17 including an annular recess 20 to define, with an annular piston body 28, a chamber 29. The piston terminates in annular metal webs 30, 31 which define seals capable of withstanding high temperatures for long periods between chamber pressurizations. A locking ring 32 carried by the piston abuts the end face 35 of nut body wall portion 24 to support a bolt tension induced by hydraulic pressure in the chamber when such pressure is reduced. The end 33 of the locking ring is recessed, as is the corresponding face portion 35 of the nut body, to ensure that if the body wall portion 24 is deflected outwardly by chamber pressure it is able to relax and slide inwardly over the ring surface, despite the axial load being transmitted when the chamber pressure is reduced.

11 Claims, 4 Drawing Sheets

HYDRAULIC TENSIONING DEVICE

TECHNICAL FIELD

This invention relates to tensioning arrangements and in particular to hydraulically operated bolts or nuts for inducing and retaining tension in studs or bolts or the like.

BACKGROUND PRIOR ART

The invention is particularly, but not exclusively, concerned with fastening devices of the type described in UK patent publication GB-A-2245681 in which an annular metal cylinder body is provided with an annular cavity in one end face thereof to receive an annular metal piston the radially inner and outer side walls of which terminate as tapering annular webs which together define an annular recess between them and exhibit such flexibility under hydraulic pressure to seal against the cavity walls whilst the piston is displaced axially along the cavity by hydraulic pressure therein. That device distinguishes from conventional hydraulic nuts by the form of sealing which obviates the necessity for materials which are unable to withstand prolonged exposure to elevated temperatures.

That specification is concerned with a hydraulic nut in which the annular metal cylinder body comprises an internally threaded nut body adapted to be threaded onto an elongated bolt or stud protruding from apparatus and the annular metal piston comprises a load ring adapted to bear against the apparatus as the piston and cylinder are separated by hydraulic pressure to induce a tensile stress in the bolt or stud. The piston is part of a piston body which includes a radially outwardly extending flange that faces the part of the cylinder body radially outwardly of the cavity such that shims inserted between said flange and body part maintain the axial juxtaposition, and thus the axial loading, after the hydraulic pressure is removed.

Although the specification, which relates principally to the sealing arrangement, describes it in relation to such a hydraulic nut in which tension loading is retained by shims, it will be appreciated that it is also conventional to maintain the relative positions of piston and cylinder body under load by means of a locking ring internally threaded to be supported by co-operating threads on the periphery of the piston or cylinder body and displaceable axially into abutment with the other prior to venting of hydraulic pressure, whereby when hydraulic pressure is removed the load is then transmitted from one body to the other by way of the abutment, ring and threaded support.

A particular use for such a hydraulic nut having the above described sealing arrangement is in a turbine casing where the nut may have to retain tensile loading from casing bolts for many years at elevated temperatures before removal by applying hydraulic fluid pressure, removing the physical retention, that is, displacing the locking ring, and reducing the hydraulic pressure to relieve the tensile loading in the bolt.

Typically in such on application, the spacing pitch of casing bolts is limited by the dimensions of the hydraulic nuts and it is desirable to minimise the radial dimensions. It is convenient to have the locking ring to surround and be supported by the piston body and be displaced axially into abutment with an end face portion of the cylinder body radially outwardly of the annular cavity so that the radial dimensions of the hydraulic nut are effectively defined by the radial dimensions of the annular cavity, dictated by fluid pressure and axial force required to be exerted, and by the radial dimensions of the cylinder body forming walls for the cavity, in withstanding chamber pressure acting radially thereon and the axial tensile loading supported after removal of pressure.

Hitherto, the radial thickness of particularly the portion of the cylinder body outwardly of the cavity has been chosen such that any distortion or deflection of the wall due to hydraulic pressure is within its elastic limits so that the wall returns to its original configuration with respect to the piston and seal arrangement when hydraulic pressure is removed. It will be appreciated that where traditional elastomeric sealing arrangements have been used the requirements for return to the precise configuration are less stringent that with the metal web sealing of the above described specification.

However it has been found that notwithstanding the choice of dimensions and materials of the cylinder body within such design limits that any hydraulic pressure induced cylinder body deflection relaxes to within the sealing ability of the metal piston webs, when the cylinder body is caused to support the axial load by way of a locking ring on the piston, there is sealing deficiency that impedes, or even prevents, subsequent pressurisation of the cavity.

It will be appreciated that the head of a bolt is directly analogous to a stud or bolt shank having a nut threadedly secured thereto in respect of applying axial forces and that the aforementioned discussion applies equally to a bolt head having an integral hydraulic tensioning arrangement as it does to a separately attached nut. In this specification the term "hydraulic tensioning arrangement" is, unless otherwise qualified, intended to refer to either nut or bolt form.

Insofar so such sealing deficiency results from forces acting on the body it must be considered to exist, albeit to a lesser degree, with any form of sealing arrangement between the piston and cylinder body and thus accommodating the effect of such forces on the body is independent of the precise form of sealing and the piston and cylinder body structures that define a cavity.

DISCLOSURE OF THE INVENTION

It is an object of the present invention to provide a hydraulic tensioning arrangement that mitigates the deficiency of known arrangements in repressurising after supporting a load by way of a cylinder body and a locking ring carried by a piston body.

According to a first aspect of the present invention a hydraulic tensioning arrangement comprises (i) an annular cylinder body surrounding a longitudinal axis and having formed in one end face thereof an axially extending annular cavity, which defines radially outwardly of the cavity a cylinder body wall portion and an end face portion, (ii) an annular piston body having an axially extending annular piston portion, defined by radially inner and outer side walls which extends into, and forms a sliding fit within, the cavity to define with the cylinder body a fluid chamber, (iii) sealing means for the chamber, (iv) locking means including a locking ring coaxially surrounding the piston body and having a ring end coaxial with, and facing, said end face portion of the cylinder body wall portion, and (v) duct means for supplying liquid at elevated pressure to said chamber to effect, in operation, pressurisation thereof and axial displacement between the piston portion and cylinder body against axial body loading thereon and permit the locking ring means to be located with said locking ring end in abutment with the said end face portion of the cylinder body, and for releasing liquid from the chamber to effect depressurisation thereof such that said axial loading is transferred between said cylinder body wall portion and the locking ring, the said end of the locking ring proximate the cylinder body being recessed to present a radially inwardly sloping face to said end face portion of the cylinder body to permit radially inward sliding of the cylinder body wall portion over the locking ring face whilst transferring axial loading.

Preferably said end face portion of the cylinder body radially outwardly of the cavity is formed with a substantially complementary slope to said end of the locking ring.

According to a second aspect of the present invention a method of inducing and maintaining a tensile stress an elongate member extending from apparatus comprises disposing either one of the cylinder body or piston body of an arrangement according to either of the two preceding paragraphs coaxially secured to the member such that the other body is supported on the apparatus, supplying liquid at elevated pressure to the chamber to displace the piston body axially with respect to the cylinder body and induce tensile stress in the member, securing the locking ring in abutment with the said end face portion of the cylinder body and against axial movements relative to the piston body, reducing the chamber pressure such that the tensile stress acts between the cylinder body end face portion and the locking ring, and, at least once, repressurising the chamber, securing the locking ring into abutment with said cylinder body face and reducing the chamber pressure.

DETAILED DESCRIPTION

Figure 1:
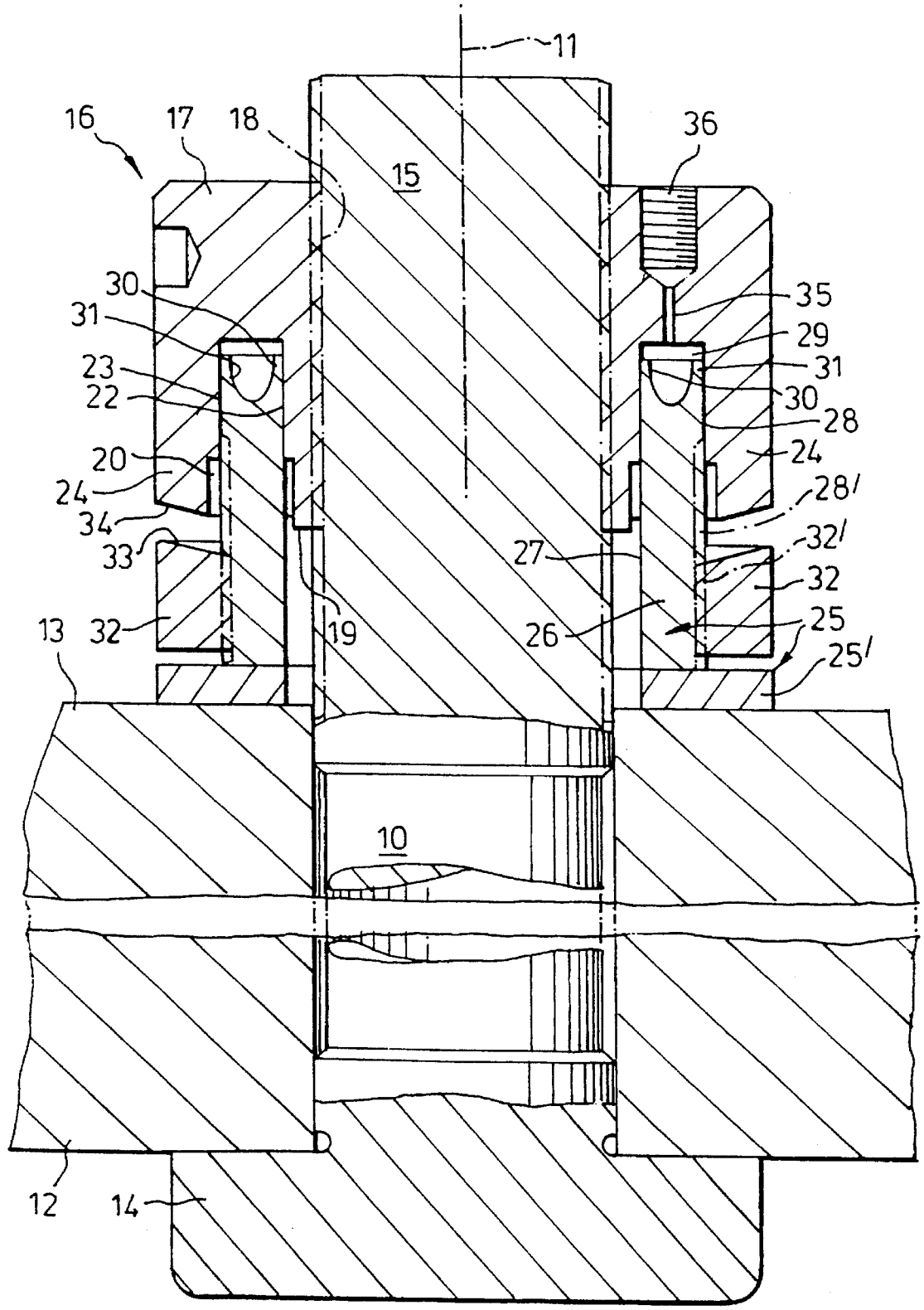
FIG. 1 sectional elevation through a hydraulic tensioning arrangement, in accordance with the present invention, in the form of a hydraulic nut, disposed on a bolt member extending from apparatus with the nut body formed by a cylinder body and a load ring formed by a piston body, and contracted axially prior to inducing tensile stress in the bolt member.
Figure 2:
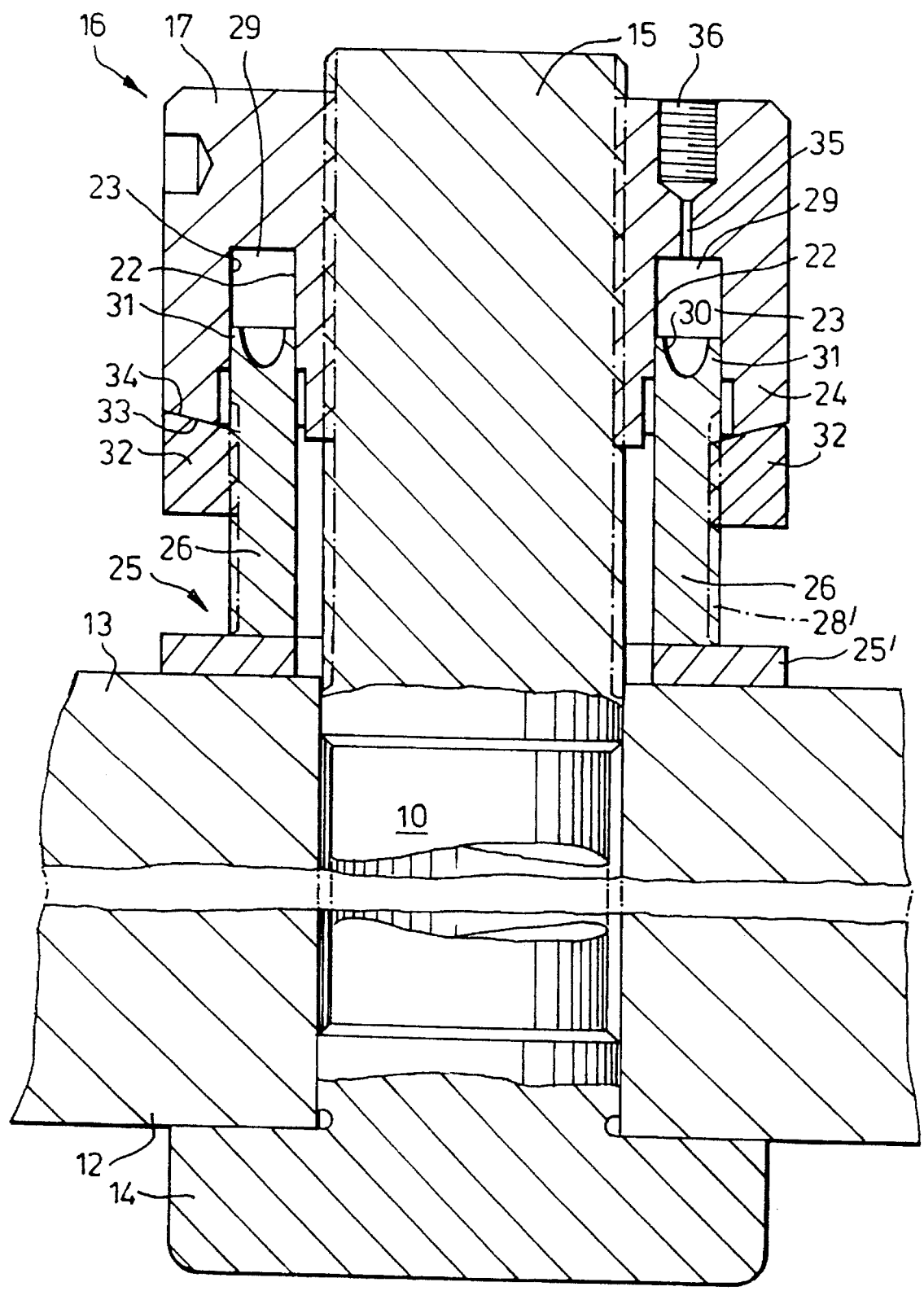
FIG. 2 is a sectional elevation similar to FIG. 1 but showing the fastening device extended axially and sustaining tensile stress in the bolt member by way of a locking ring.

Referring to FIGS. 1 and 2, a bolt 10 having longitudinal axis 11 is used to clamp together two parts 12, 13 of apparatus. The bolt has a head 14 arranged to bear against one part 12 of the apparatus and has a threaded shank portion 15 which extends from the other part 13. The apparatus parts 12, 13 are held together in compression by way of a tensile stress induced and sustained in the bolt by a hydraulic nut 16 threaded onto the shank portion and reacted into the part 13.

The hydraulic nut 16 is substantially as described in the aforementioned GB-A-2245681, comprising an annular nut body 17 coaxial with the bolt whose radially inner wall 18 is threaded to engage with the bolt and whose lower end face 19 contains an axially extending annular cavity 20. The radially inner and outer walls 22, 23 respectively, of the cavity face each other and extend substantially parallel to each other and to the longitudinal axis 11. The nut body, by virtue of the cavity 20, comprises a cylinder body. The part 24 of the cylinder body radially outwardly of the cavity may conveniently be referred to as the cylinder body wall portion.

An annular piston body 25 comprises a load ring member disposed between the nut body and the apparatus part 13. The load ring includes an optional washer member 25' and an upstanding annular piston portion 26, defined by radially inner and outer side walls 27, 28 respectively, which extends into and forms a sliding fit within the cavity 20 to define, with the cylinder body, a chamber 29. The radially inner and outer side walls 27, 28 of the annular piston portion terminate within the chamber 29 in axially-extending, tapering annular webs 30, 31 which constitute sealing means between the piston and cylinder walls for the chamber.

Hydraulic nut locking means includes a locking ring 32 coaxially surrounding the upstanding portion of the piston body and having a ring end 33 coaxial with, and facing, the end face portion 34 of the cylinder body wall portion 24. The locking ring has its radially inner axial wall 32' threaded and is supported by a co-operatively threaded axially extending radially outer side wall 28' of the piston portion axially displaced from said web portion.

Duct means 35, including a standard threaded connection port 36, extends through the cylinder body to the chamber 29 to permit hydraulic fluid to be supplied thereto at elevated pressure and vented therefrom.

The hydraulic nut device as thus far described is conventional in respect of the elements being known per se within the art. However, whereas in the art it is conventional for the abutting faces of nut body and locking ring to extend normal to the longitudinal axis 11, in accordance with the present invention, it differs in that the end 33 of the locking ring 32 proximate the cylinder body is recessed to present a radially inwardly sloping face to the end face portion 34 of the cylinder body wall portion 24, that is, radially outward of the cavity 20.

Conveniently, the end face portion 34 of the cylinder body is formed with a substantially complementary slope to the end 33 of the locking ring.

The recess in the end of the locking ring may conform to part of the surface of a sphere centred on the longitudinal axis, that is, the end face of the ring may have slight curvature in a radial direction, or may conform to part of the surface of a cone centred on the longitudinal axis, that is, the said face of the ring is substantially flat in a radial direction, although any other profile of ring end that is consistent with providing a recess may be employed, within the constraints required of the recess slope as discussed hereinafter.

Operation of the hydraulic nut arrangement is conventional in that with the chamber 29 vented, the cylinder body (nut body) is assembled on the shank 15 of a bolt and rotated to move towards the apparatus part 13 until the piston body (load ring) 25 abuts the part 13 and is substantially fully retracted into the cavity 20 to define a minimal chamber 29. Hydraulic fluid is introduced by way of duct 36 to the chamber 29 at elevated pressure to establish a high pressure within the chamber, both driving the piston web parts 30, 31 into sealing contact with the walls of the cavity and driving the piston an cylinder bodies apart axially, such motion stretching the bolt longitudinally with respect to the apparatus 13 and inducing a tensile stress therein related to the axial force and the fluid pressure whilst correspondingly compressing the parts of the apparatus. When a specified tensile stress has been achieved, the locking ring 32 is displaced axially and secured in abutment with the end face portion 34 of the cylinder body by means of the thread interengagement as show in FIG. 2, at which time the pressure in chamber 29 is reduced such that the bolt tensile stress previously supported by way of the base of the cavity and the end of the piston portion is maintained by way of the cylinder body wall portion 24, end face portion 34, locking ring 32 and threaded surface 28' of the piston portion.

When the chamber is pressurised and the piston is axially displaced towards the lip of the cavity, as shown in FIG. 2, the pressure acting on the chamber wall 23 tends to deflect the wall portion 24 radially outwardly to an extent dependant on the material and its thickness. Such deflection is usually very small and within the elastic limits of the material; furthermore the same pressure deflects the piston web member 31 to ensure that sealing continues to be effective.

When the chamber pressure is reduced the piston webs relax to the initial state and the outer wall portion 24 of the nut body tends to do likewise as the axial load of bolt tension acts by way of the locking ring.

Notwithstanding the large axial load transmitted to the end of the locking ring the recessed ring end permits the end face portion 34 to slide radially inwardly across the face of the locking ring as part of said relaxation of the portion 16' to resume its contacting relationship with the piston web 31.

This is in contrast to the above-outlined conventional arrangement wherein the end of the locking ring and end face portion of the cylinder body are normal to the longitudinal axis 11, where it has been found that the lip of the cavity tends to dig in to, or swage, the end of the locking ring and fails to restore radially. Although this has no significant effect in terms of supporting the axial load it is found that the initial seal between the fully relaxed piston web 31 and partly deflected cavity wall 23 is insufficient to permit proper repressurisation of the chamber 29.

It has been found that a recess slope of the order of 5° to the normal to the longitudinal axis is sufficient to permit radial relaxation of the cylinder body wall portion 24 without introducing components of the transmitted load force in a non-axial direction that affect the efficiency of the load transfer.

The small recess inclination combines with the load force to generate a small radially inward reaction component on the cylinder body end face portion 34 that encourages, or at least overcomes resistance to, radial movement of the cylinder body wall portion 24 into sealing contact with the piston web 31.

Although for the purpose of permitting the cylinder body portion 16 to relax radially inwardly, the shape of the end face portion 34 does not have to be precisely defined, it will be understood that in order to distribute the axial load uniformly it is desirable that the end face portion conforms in a substantially complementary manner to the recess in the locking ring when both are in an stressed or loaded state.

It will be appreciated that in operation the tension maintaining load force acting axially along the cylinder body wall portion 24 forms in the locking ring a radially outward component in the locking ring due to the recess slope and an axial component that is radially offset from the reaction force generated at the threaded support 28' of the piston portion, the result being a tendency for the upper part of the locking ring to deflect radially outwardly so that faces of the ring and cylinder body which conform prior to use may not do so precisely in use.

If desired, and if the degree of ultimate ring deflection in use can be predicted, the slopes of the ring recess and the end face portion of the cylinder body may be formed differentially to effect conformity with each other when the ring is under load.

If such loading effects are slight, it may be preferred to neglect them and make the locking ring end recess and cylinder body end face portion conform when unloaded, that is, by being manufactured with the same slope.

The mating surfaces of the ring recess and the face portion of the cylinder body may be caused to conform with each other optionally by bedding-in under load, which process also enables the radial relaxation of the cylinder body portion and sealing efficiency to be ascertained prior to installation.

In such a process the hydraulic nut may be secured to a bolt with which it is to be used or a dummy bolt, the chamber 29 pressurised to induce a tensile stress in the bolt, the locking ring run along the piston body and secured in abutment with the cylinder body and the chamber vented leaving the bolt tension reacting by way of the cylinder body and face portion 34 and locking ring 32. At least once thereafter, and preferably several times, the cylinder is repressurised and the locking ring repositioned and secured again in abutment with the cylinder body before chamber pressure is reduced and loading between cylinder body and locking ring re-applied. The hydraulic nut may then be reassembled onto a bolt with which to be used and installed to induce and maintain the appropriate tensile stress in the bolt.

Such cycling of pressurisation and loading serves to mitigate minor non-conformities between the mating surfaces of locking ring and cylinder body under load and to ensure that the piston webs and cavity walls form an efficacious seal for repeated repressurisation after installation.

It will be appreciated that the hydraulic nut in accordance with the present invention is not limited to that shown in FIGS. 1 and 2. For example, the annular piston body may be internally threaded to form the nut body for engagement with a bolt 15, and the cylinder body form the load ring resting on the apparatus part 13.

Figure 3:
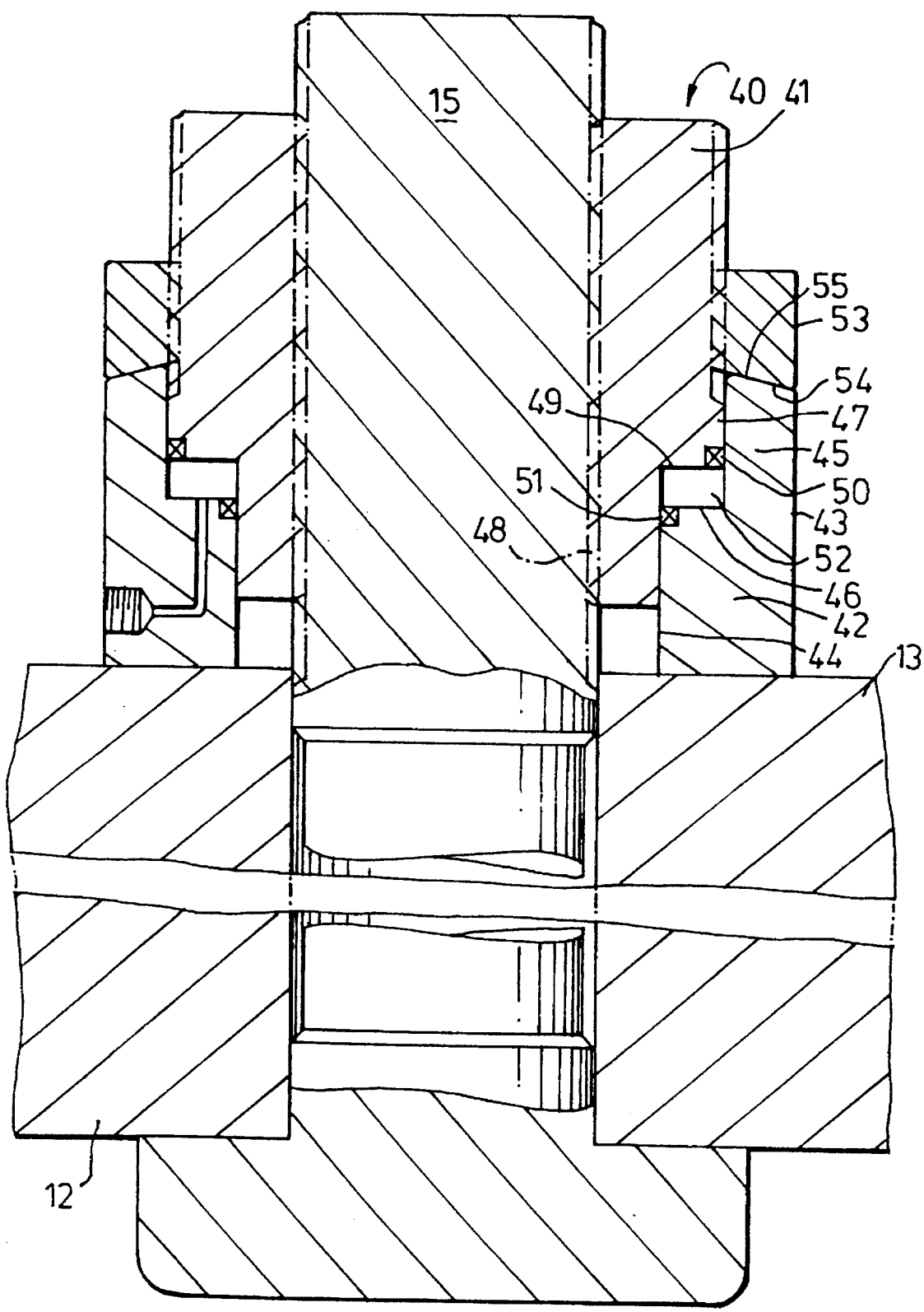
FIG. 3 is a sectional elevation through a further form of the arrangement according to the present invention comprising a hydraulic nut with the piston body instead of the cylinder body forming the nut body.

Furthermore, it will be appreciated that a hydraulic nut in accordance with the present invention need not be based upon a structure described in the aforementioned GB-A-2245681 in which the piston body is contained within a cavity defined between radially outer and inner walls of a cylinder body and in which metal webs integral with the piston body provide the sealing means. FIG. 3 shows a hydraulic nut 40 which illustrates both a reversal of juxtaposition of piston and cylinder bodies 41, 42 respectively in relation to the bolt 15 and apparatus part 13, as mentioned in the last but one paragraph and a different chamber defining structure, itself well known in the art.

The cylinder body 42 has its radially outer side wall 43 axially longer than the radially inner side wall 44 to define cylinder body wall portion 45 and a step-like annular cavity 46 in which the piston body slides. The piston body has its radially outer side wall 47 axially shorter than the radially inner, threaded, side wall 48 and defines an annular cavity 49 of equal radius to that 46, and with annular seals 50, 51 defines fluid chamber 52.

Locking means in the form of an internally threaded locking ring 53 is carried on the threaded outer wall of the piston body and faces end face portion 54 of the radially outer body portion 45 of the cylinder body.

As described with respect to FIGS. 1 and 2, the locking ring is positionable by rotation about the piston body, when hydraulic pressure in the chamber stresses the bolt, to abut the end face portion 54 of the cylinder body portion 45 and thereafter retained against axial movement by the thread engagement. The end 55 of the locking ring at least, and preferably end face 54 of the cylinder body portion, is recessed to permit radially inward sliding of the cylinder body wall portion over the locking ring face whilst transferring axial loading.

A hydraulic device in accordance with the invention is not limited to the threaded locking ring carried by the piston body and moveable into abutment with the end face position of the cylinder body.

Figure 4:
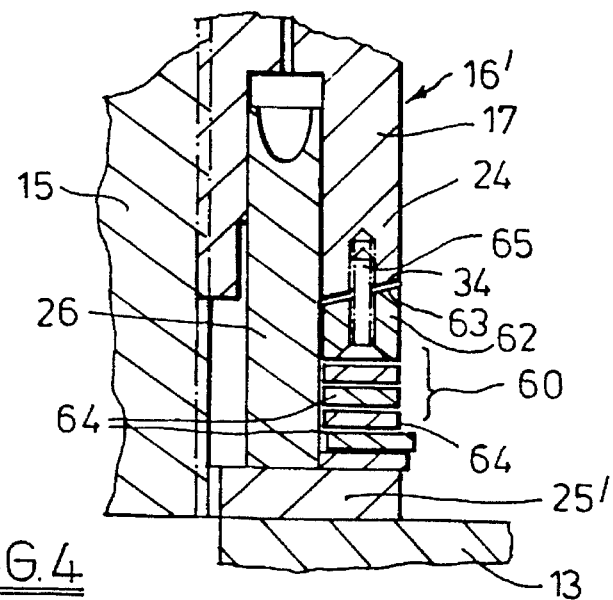
FIG. 4 is a sectional elevation through a part of a further form of the arrangement according to the present invention, similar to that of FIG. 2 but showing an alternative form of locking means.

For example, referring to FIG. 4, which shows part of a hydraulic nut 16' corresponding in most respects to the nut 16 of FIG. 2, it is distinguished in that the locking means 60 comprises a locking ring 62, having a recessed end 63 similar to the ring 32 but unthreaded and freely moveable axially with respect to the axially extending outer side wall of the piston body 26, and a plurality of shims 64 arranged to be disposed about the side wall of the piston body between the locking ring and the apparatus part 13 or washer member 25' as appropriate so that when chamber pressure is reduced axial loading on the cylinder body is transferred by way of the cylinder wall portion 24, locking ring 63 and shims 64 into the apparatus.

Conveniently, the locking ring 63 is loosely carried by the end face portion 34 of the cylinder body by way of screws 65, which facilitates disposing the recessed end adjacent the end face portion 34 whilst shims are inserted and no load carried but does not interfere with radial relaxation of the cylinder body wall portion when transmitting load.

It will be appreciated that a hydraulic tensioning arrangement in accordance with the present invention may take a form other than a hydraulic nut, in which the nut body is threaded for securing to a threaded stud or bolt member. It may take the form of a jack in which the annular cylinder body (FIGS. 1, 2) or piston body (FIG. 3) is otherwise secured to apply tension to the member or acts simply as a support for a puller which is internally threaded or otherwise adapted to engage a bolt or the like.

The above embodiments have been restricted to the arrangement taking the form of a hydraulic nut or like jacking device for securing to the end of an elongate stud or bolt member.

Figure 5:
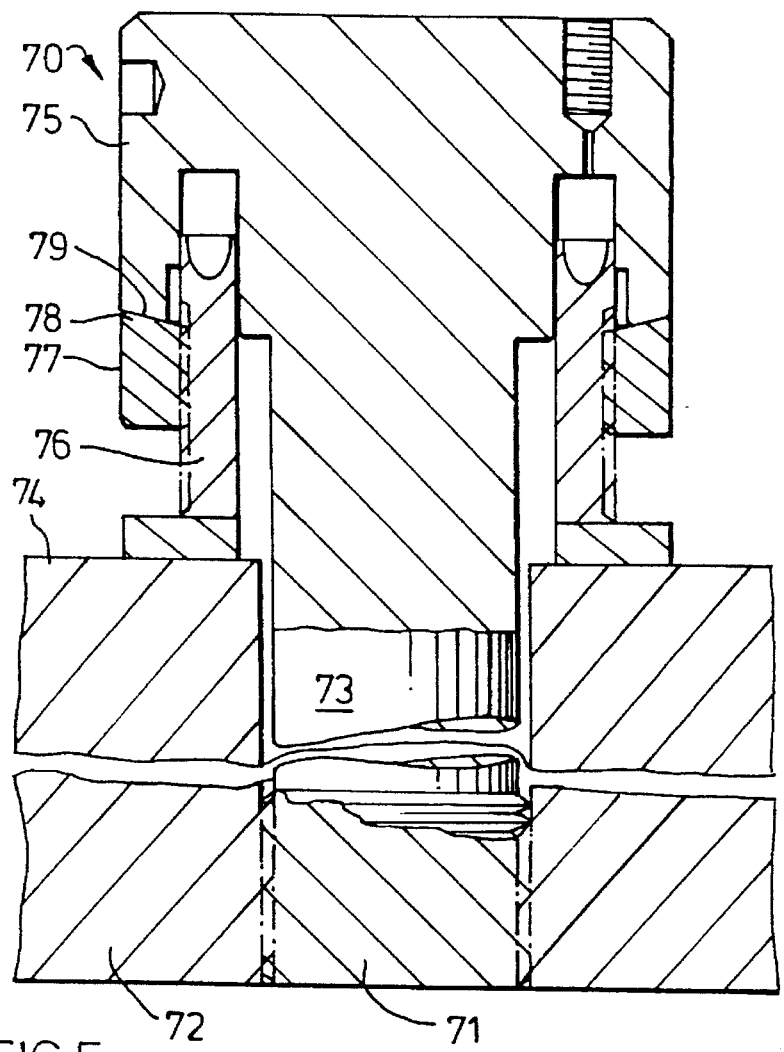
FIG. 5 is a sectional elevation through a hydraulic tensioning arrangement in accordance with the invention in the form of a hydraulic bolt extending from apparatus to be compressed thereby.

It will be appreciated that as shown in FIG. 5 the hydraulic tensioning arrangement may take the form of a bolt 70 having a threaded end 71 secured to apparatus part 72 and a shank 73 extending out of apparatus part 74. The bolt head 75 corresponds to the hydraulic nut 16 shown in FIGS. 1 and 2 except that what was the nut body 17 of those Figures is an integral part of the bolt head. Operation, and the function of the recessed locking ring, is analogous to that described hereinbefore and requires no further description. The bolt head is shown as forming a cylinder body which receives a piston body 76 forming a load ring and carrying a locking ring 77. The end 78 of the locking ring is recessed as is the end face portion 79 of the cylinder body portion radially outwards of the chamber and operation is as described hereinbefore for hydraulic nut 16. It will be appreciated that the bolt head may be formed as a piston body and the load ring as a cylinder body analogously to FIG. 3.

I claim:

1. A hydraulic tensioning arrangement comprising (i) an annular cylinder body surrounding a longitudinal axis and having formed in one end face thereof an axially extending cavity, which comprises radially outwardly of the cavity a cylinder body wall portion and an end face portion thereof, (ii) an annular piston body having an axially extending annular piston portion, which extends into, and forms a sliding fit within, the cavity to define with the cylinder body a fluid chamber, (iii) sealing means for the chamber, (iv) locking means including a locking ring coaxially surrounding the piston body and having a ring end coaxial with, and facing, said end face portion of the cylinder body wall portion, and, (v) duct means for supplying liquid at elevated pressure to said chamber to effect, in operation, pressurisation thereof and axial displacement between the piston portion and cylinder body against axial loading thereon and permit the locking means to be located with said locking ring end in abutment with the said end face portion of the cylinder body, and for releasing liquid from the chamber to effect depressurisation thereof such that said axial loading is transferred between said cylinder body wall portion and the locking ring, the said end of the locking ring proximate the cylinder body being recessed to present a radially inwardly sloping face to said end face portion of the cylinder body to permit radially inward sliding of the cylinder body wall portion over the locking ring face whilst transferring said axial loading.

2. An arrangement as claimed in claim 1 in which the recess in said end of the locking ring comprises part of the surface of a sphere centered on said longitudinal axis.

3. An arrangement as claimed in claim 1 in which the recess in said end of the locking ring comprises part of a surface of a cone centred on said longitudinal axis.

4. An arrangement as claimed in claim 1 in which the recess has a slope sufficiently shallow to permit said end face portion of said cylinder body to slide with respect to the end face of the locking ring whilst exerting thereon said axial loading.

5. An arrangement as claimed in claim 4 in which the slope of the recess is about 5° with respect to the normal to said longitudinal axis.

6. An arrangement as claimed in claim 1 in which said end face portion of the cylinder body radially outwardly of the cavity is formed with a substantially complementary slope to said end of the locking ring.

7. An arrangement as claimed in claim 6 in which the slope of the end face portion of the cylinder body is arranged to complement the slope of the recess resulting from radially outward deflection of the recessed end of the locking ring under said axial loading due to a turning couple produced by said axial loading acting radially outwardly of the reaction thereto at the threaded radially outer wall of the piston portion.

8. An arrangement as claimed in claim 1 in which the locking means comprises a locking ring having its inner axially extending wall threaded and carried by a co-operatively threaded, axially extending radially outer side wall of the piston body.

9. An arrangement as claimed in claim 1 in which the locking means comprises a locking ring freely moveable axially with respect to an axially extending radially outer side wall of the piston body and a plurality of shims arranged to be disposed about the piston body to support said locking ring in abutment with said end face portion of the cylinder body and against axial movement with respect to the piston body portion.

10. An arrangement as claimed in claim 9 in which the locking ring is loosely carried on said end face portion of the cylinder body wall portion.

11. An arrangement as claimed in claim 1 comprising a hydraulic nut in which the radially inner annular wall of one of the cylinder and piston bodies is adapted to operatively surround and engage with a stud or bolt member extending from apparatus, upon which the other one of the cylinder and piston bodies is supported, in order to induce and maintain a tensile stress in the member.

\* \* \* \* \*